(12) United States Patent
Gattupalli et al.

(10) Patent No.: US 10,272,406 B2
(45) Date of Patent: Apr. 30, 2019

(54) REACTOR AND HEATER CONFIGURATION SYNERGIES IN PARAFFIN DEHYDROGENATION PROCESS

(71) Applicant: UOP LLC, Des Plaines, IL (US)

(72) Inventors: Rajeswar Gattupalli, Buffalo Grove, IL (US); Quan Yuan, Buffalo Grove, IL (US); Clayton C. Sadler, Arlington Heights, IL (US); Michael J. Vetter, Schaumburg, IL (US); Bryan J. Egolf, Crystal Lake, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/799,895

(22) Filed: Oct. 31, 2017

(65) Prior Publication Data
US 2018/0050315 A1 Feb. 22, 2018

Related U.S. Application Data

(63) Continuation of application No. PCT/US2016/038715, filed on Jun. 22, 2016.

(Continued)

(51) Int. Cl.
*B01J 8/08* (2006.01)
*B01J 8/04* (2006.01)
(Continued)

(52) U.S. Cl.
CPC ............ *B01J 8/087* (2013.01); *B01J 8/0285* (2013.01); *B01J 8/0496* (2013.01); *B01J 8/125* (2013.01); *C10G 35/04* (2013.01); *C10G 35/12* (2013.01); *F22B 29/06* (2013.01); *F24H 1/145* (2013.01); *F28D 7/00* (2013.01); *F28D 7/06* (2013.01);
(Continued)

(58) Field of Classification Search
CPC . B01J 8/087; B01J 8/085; B01J 8/0492; B01J 8/0496; B01J 2208/00176; B01J 2208/00194; B01J 2208/00203; B01J 2208/00504; C10G 35/12; F28F 13/08; F28D 7/06
See application file for complete search history.

(56) References Cited

U.S. PATENT DOCUMENTS 4,160,701 A * 7/1979 Dorner ............... C10G 9/20
122/235.14
4,986,222 A 1/1991 Pickell et al.
(Continued)

FOREIGN PATENT DOCUMENTS

| CN | 201885569 U | 6/2011 |
|---|---|---|
| JP | 2011234855 A | 11/2011 |
| RU | 2064823 C1 | 8/1996 |

OTHER PUBLICATIONS

Search Report dated Oct. 13, 2016 for corresponding PCT Application No. PCT/US2016/038715.
(Continued)

*Primary Examiner* — Lessanework Seifu

(57) ABSTRACT

An apparatus for heating a process fluid is presented. The apparatus is for improving the foot-print of a fired heater and to reduce the fired heater volume. The apparatus includes a W-shaped process coil to provide for a smaller single-cell fired heater, and a fired heater with a lower profile, providing flexibility in positioning relative to downstream reactors.

17 Claims, 2 Drawing Sheets

Related U.S. Application Data

(60) Provisional application No. 62/186,810, filed on Jun. 30, 2015.

(51) Int. Cl.
| | |
|---|---|
| *C10G 35/04* | (2006.01) |
| *F28D 7/00* | (2006.01) |
| *F28D 7/06* | (2006.01) |
| *C10G 35/12* | (2006.01) |
| *F22B 29/06* | (2006.01) |
| *F24H 1/14* | (2006.01) |
| *B01J 8/12* | (2006.01) |
| *B01J 8/02* | (2006.01) |

(52) U.S. Cl.
CPC .............. *B01J 2208/0053* (2013.01); *B01J 2208/00132* (2013.01); *B01J 2208/00141* (2013.01); *B01J 2208/00176* (2013.01); *B01J 2208/00504* (2013.01)

(56) References Cited

U.S. PATENT DOCUMENTS

| | | |
|---|---|---|
| 5,247,907 A | 9/1993 | Lee et al. |
| 5,878,699 A | 3/1999 | Barnett et al. |
| 6,178,926 B1 | 1/2001 | Worman |
| 6,237,545 B1 | 5/2001 | Barnett et al. |
| 8,323,365 B2 | 12/2012 | Drnevich et al. |
| 8,490,581 B2 | 7/2013 | Chhotray et al. |
| 2008/0142411 A1 | 6/2008 | Barendregt et al. |
| 2014/0045133 A1 | 2/2014 | Myszka et al. |
| 2014/0323781 A1 | 10/2014 | Hartman et al. |

OTHER PUBLICATIONS

Garg, "Get the most from your fired heater", originally appearing in Chemical Engineering, vol. 111, Issue 3, Mar. 2004, pp. 60-64.
Esteem, "Modular Construction of Fired Heaters", Esteem website.
Foster Wheeler, "Fired Heaters", Foster Wheeler's website.
U.S. Appl. No. 15/799,873, filed Oct. 31, 2017.

\* cited by examiner

REACTOR AND HEATER CONFIGURATION SYNERGIES IN PARAFFIN DEHYDROGENATION PROCESS

CROSS-REFERENCE TO RELATED APPLICATIONS

This application is a Continuation of copending International Application No. PCT/US2016/038715 filed Jun. 22, 2016 which application claims benefit of U.S. Provisional Application No. 62/186,810 filed Jun. 30, 2015, the contents of which cited applications are hereby incorporated by reference in their entirety.

FIELD OF THE INVENTION

The present invention relates to fired heaters for use in process involving chemical reactions, and in particular to the reforming process.

BACKGROUND

Fired heaters are common process units in chemical plants. The fired heaters heat process streams to reaction temperatures, and provide heat to process streams that have endothermic reactions. A fired heater has a general configuration of a tube for carrying a process fluid inside a shell wherein burners are used to combust a fuel to heat the tubes.

With more complex processes, and with upgrades to processes in chemical plants, new configurations are needed to reduce the area taken up by fired heaters, and to provide for new efficiencies in the heating of process fluids.

Different processes have different needs from fired heaters, and these different needs can affect the designs to produce improved fired heaters that have a significant economic impact.

SUMMARY

The present invention is an improved fired heater design and integration with downstream reactors.

A first embodiment of the invention is an integrated apparatus for a reforming system, comprising a plurality of radiant fired heaters having at least one process coil disposed within the heater, burners, and a flue gas outlet, wherein the process coils have one outlet, at least one inlet; and one outlet manifold per heater having an inlet in fluid communication with the process coils outlets and at least one manifold outlet. An embodiment of the invention is one, any or all of prior embodiments in this paragraph up through the first embodiment in this paragraph wherein each process coil has a configuration of three tubes in a parallel orientation, with two semi-circular tubular sections connecting the ends of the tubes, such that the tubes and tubular sections form a W-shaped coil, with the central tube having an increased diameter, and the two smaller tubes having one end connected to an inlet port and the larger central tube having one end connected to the outlet port. An embodiment of the invention is one, any or all of prior embodiments in this paragraph up through the first embodiment in this paragraph, further comprising a convection bank having an inlet in fluid communication with the flue gas outlet, and heating tubes, wherein the heating tubes have an inlet and an outlet. An embodiment of the invention is one, any or all of prior embodiments in this paragraph up through the first embodiment in this paragraph, wherein the heating tubes are for steam generation. An embodiment of the invention is one, any or all of prior embodiments in this paragraph up through the first embodiment in this paragraph, further comprising a plurality of moving bed reactors, wherein there is one radiant fired heater for each reactor. An embodiment of the invention is one, any or all of prior embodiments in this paragraph up through the first embodiment in this paragraph wherein the reactors are stacked vertically, and the radiant fired heaters are arranged side-by-side near the stack of reactors. An embodiment of the invention is one, any or all of prior embodiments in this paragraph up through the first embodiment in this paragraph, wherein the process coil inlet ports and the outlet port are disposed on the upper surface of the fired heater. An embodiment of the invention is one, any or all of prior embodiments in this paragraph up through the first embodiment in this paragraph wherein the flue gas outlet is disposed on the lower surface of the fired heater. An embodiment of the invention is one, any or all of prior embodiments in this paragraph up through the first embodiment in this paragraph wherein the radiant fired heaters are arranged in a side-by-side disposition.

A second embodiment of the invention is integrated apparatus for a reforming system, comprising: a plurality of moving bed reactors, each reactor having a process fluid inlet and a process fluid outlet; a plurality of radiant fired heaters having at least one process coil disposed within the heater, burners, and a flue gas outlet, wherein the process coils have a configuration of three tubes in a parallel orientation, with two semi-circular tubular sections connecting the ends of the tubes, such that the tubes and tubular sections form a W-shaped coil, with the central tube having an increased diameter, and the two smaller tubes having one end connected to an inlet port and the larger central tube having one end connected to the outlet port; at least two inlet manifolds, each manifold having an inlet, and multiple outlets, with each inlet manifold outlet in fluid communication with one process coil inlet; and one outlet manifold per heater having an inlet in fluid communication with the process coils outlets and at least one manifold outlet in fluid communication with the reactor process fluid inlet. An embodiment of the invention is one, any or all of prior embodiments in this paragraph up through the second embodiment in this paragraph wherein the reactors are stacked vertically, and the radiant fired heaters are arranged side-by-side near the stack of reactors. An embodiment of the invention is one, any or all of prior embodiments in this paragraph up through the second embodiment in this paragraph wherein the plurality of reactors comprises four reactors stacked vertically. An embodiment of the invention is one, any or all of prior embodiments in this paragraph up through the second embodiment in this paragraph wherein the process coil inlet ports and the outlet port are disposed on the upper surface of the fired heater. An embodiment of the invention is one, any or all of prior embodiments in this paragraph up through the second embodiment in this paragraph wherein the process coil inlet ports and the outlet port are disposed on the upper surface of the fired heater. In an alternate embodiment, the flue gas outlet can be disposed on either the upper surface of the fired heater or the lower surface of the fired heater.

A third embodiment of the invention is an integrated apparatus for a reforming system, comprising: a plurality of reactors, each reactor having a process fluid inlet and a process fluid outlet, a plurality of radiant fired heaters having at least one process coil disposed within the heater, burners, and a flue gas outlet, wherein the process coils have a compressed design including at least two tubular sections, wherein each tubular section has an inlet, and the tubular sections merge to form a third tubular section with one outlet; and one outlet manifold per heater having an inlet in fluid communication with the process coils outlets and at least one manifold outlet in fluid communication with a reactor process fluid inlet. An embodiment of the invention is one, any or all of prior embodiments in this paragraph up through the third embodiment in this paragraph wherein each process coil has a configuration of three tubes in a parallel orientation, with two semi-circular tubular sections connecting the ends of the tubes, such that the tubes and tubular sections form a W-shaped coil, with the central tube having an increased diameter, and the two smaller tubes having one end connected to an inlet port and the larger central tube having one end connected to the outlet port. An embodiment of the invention is one, any or all of prior embodiments in this paragraph up through the third embodiment in this paragraph wherein the reactors are moving bed reactors. An embodiment of the invention is one, any or all of prior embodiments in this paragraph up through the third embodiment in this paragraph wherein the reactors are fixed bed reactors. An embodiment of the invention is one, any or all of prior embodiments in this paragraph up through the third embodiment in this paragraph wherein the reactors are stacked vertically, and the radiant fired heaters are arranged side-by-side near the stack of reactors.

Other objects, advantages and applications of the present invention will become apparent to those skilled in the art from the following detailed description and drawings.

DETAILED DESCRIPTION

Chemical processes frequently need heating. Process heaters are designed to heat feed streams or intermediate process streams to temperatures necessary for the chemical reactions in the processes to occur at a reasonable rate. Process heaters can be single-cell or dual-cell and are equipped with different shapes of coils line "U-shaped" that allow for a process fluid to be heated. The coils are mounted in fired heaters that include burners. A fired heater is typically a box-shaped furnace with the coils inside the box and burners mounted on the sides or bottoms of the furnace. For a commercial process, a fired heater can be a very large item. The fired heaters can be as much as 25% of the equipment cost, and improvements in the designs to reduce costs are important.

Fired process heaters often cause non-selective reactions, such as thermal conversion or cracking of hydrocarbons. These non-selective reactions reduce yields and increase losses. Redesigned heaters can reduce these losses and proved for more desirable capital cost, operation costs and reduced area, or smaller plot space, required for a heater.

Single-cell or dual-cell fired heaters equipped with U-shaped process coils, and end-wall mounted horizontal round-flame burners are widely used in processes, such as dehydrogenation and reforming. In dehydrogenation processes, the reactions include many undesired reactions. An estimated 30% to 40% of the non-selectivity is caused by thermal cracking in the fired heaters. Redesign of the heaters can reduce the amount of these non-selective reactions, in addition to reducing capital cost and the footprint, or area, occupied by the fired heaters.

Figure 1:
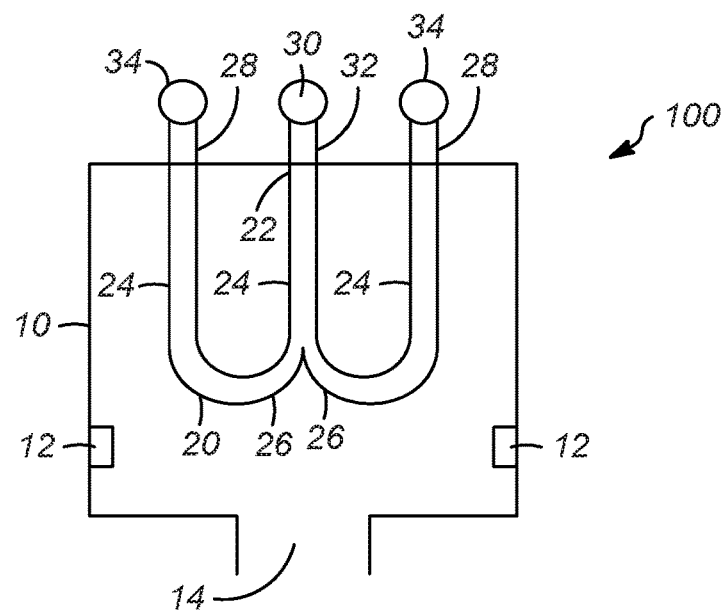
FIG. 1 shows a cross-section of a fired heater with one process coil.
Figure 3:
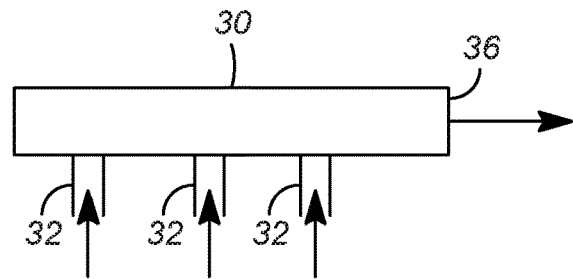
FIG. 3 shows one embodiment of an outlet manifold.
Figure 4:
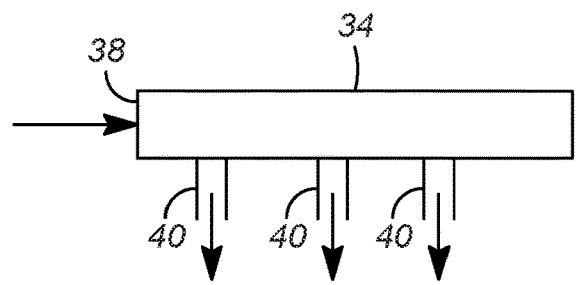
FIG. 4 shows one embodiment of an inlet manifold.
Figure 5:
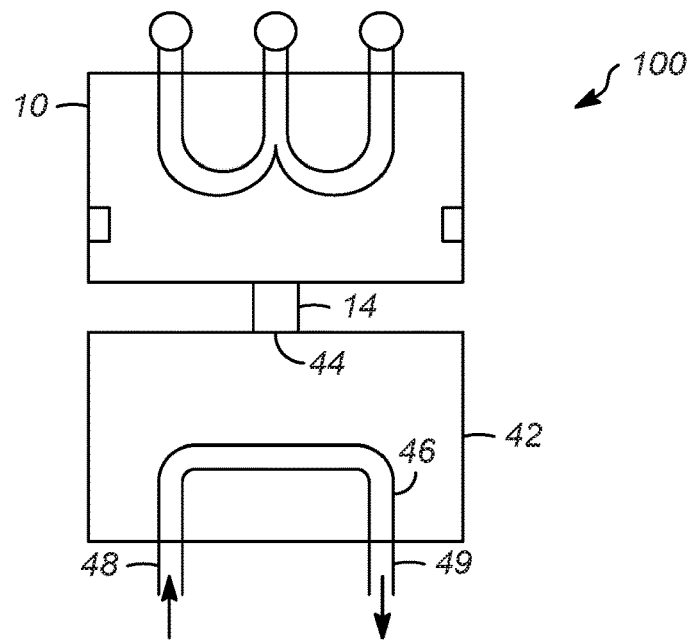
FIG. 5 shows one embodiment of fired heater with a convention bank.

The present invention is an integrated system for a plurality of reactors and radiant fired heaters. The apparatus provides for heat to be added to an endothermic process wherein the reaction in the reactor causes a temperature drop and the process stream is reheated between reactors to bring the reaction up to a desired reaction temperature. The radiant fired heaters, as shown in FIG. 1, include at least one process coil 20 disposed within the fired heater 10. The fired heater 10 includes burners 12 and a flue gas outlet 14. The apparatus 100 includes at least one outlet manifold 30 having and inlet 32 in fluid communication with each process coil outlet 22. The outlet manifold 30 includes an outlet 36 for passing the process stream to a downstream reactor, as shown in FIG. 3. The apparatus 100 includes at least two inlet manifolds 34 in fluid communication with a process coil 20. The inlet manifold 34 includes an inlet 38 and outlets 40 in fluid communication with the process coil 20, as shown in FIG. 4. The apparatus 100 can include a convection bank 42 with an inlet 44 in fluid communication with the flue gas outlet 14 of the fired heater 10. The convection bank 42 includes heating tubes 46 having an inlet 48 and an outlet 49.

Each process coil 20 has a configuration of three tubes 24 in a substantially parallel orientation, and two curved tubular sections 26 to form a process coil having a substantially W-shape, with two inlets 28 and one outlet 22. The use of the improved process coil 20 allows for a more narrow fired heater. In addition, the use of the W-shaped coil allows for bringing the outlet manifold closer to the fired heater process coil outlets.

Figure 2:
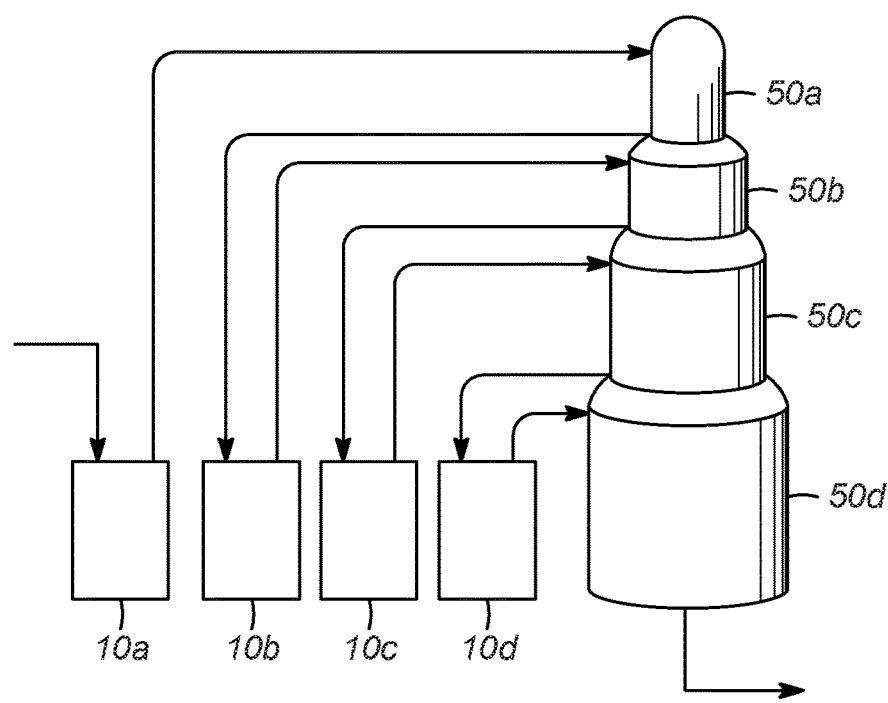

In one embodiment, the integrated apparatus, as shown in FIG. 2, includes a plurality of moving bed reactors 50*a,b,c,d* with a plurality of radiant fired heaters 10*a,b,c,d*. The moving bed reactors 50*a,b,c,d* are stacked vertically, and catalyst flows down through the series of reactor beds. The process fluid is heated before entering each reactor 50*a,b, c,d*, and withdrawn from each reactor 50*a,b,c,d* to be passed to a subsequent fired heater 10*a,b,c,d*, before being reintroduced to the next reactor 50*a,b,c,d* in the series. In a specific embodiment, the integrated apparatus includes 4 reactors and 4 fired heaters, and with the fired heaters disposed in a side by side arrangement.

By redesigning the fired heaters 10, the heating volume is reduced and the width of the heaters is reduced, and the footprint, or area, of the fired heater 10 is reduced. In a specific embodiment, the fired heaters include the process coils with inlet ports and outlet ports disposed on the upper surface of the fired heaters. The fired heaters include a flue gas outlet, and a preferred embodiment includes a flue gas outlet disposed on the lower surface of the fired heater.

In one embodiment, the integrated apparatus includes a convection bank. The convection bank is a unit having an inlet in fluid communication with the flue gas outlet from the fired heater. The convection bank includes heating tubes inside the convection bank for passing a fluid to be heated. The convection bank is for recovering heat from the flue gases which exit the fired heaters at temperatures between 700° C. and 1100° C. One method of heat recovery is passing water through the heating tubes to generate steam.

In another embodiment, the integrated apparatus is for a reforming system. The reforming system includes a plurality of reactors, with each reactor having a process fluid inlet and a process fluid outlet. The apparatus further includes a plurality of radiant heaters, with each heated having at least one process coil disposed within the heater. Each heated includes burners and a flue gas outlet. The process coils each have a configuration of three tubes in a parallel orientation, with two semi-circular tubular sections connecting the ends of the tubes, such that the tubes and tubular sections form a W-shaped coil, with the central tube having an increased diameter, and the two smaller tubes having one end connected to an inlet port and the larger central tube having one end connected to the outlet port. The apparatus further includes at least two inlet manifolds, with each inlet manifold having an inlet and multiple outlets, with each inlet manifold outlet in fluid communication with one process coil inlet. The apparatus also includes one outlet manifold per heater, each outlet manifold having multiple inlets with each inlet in fluid communication with a process coil outlet, and a manifold outlet in fluid communication with the reactor process fluid inlet. In one embodiment, the fired heaters have the process coil inlet ports and outlet ports disposed on the upper surface of the fired heater, and a flue gas outlet disposed on the lower surface of the fired heater.

The reactors can be moving bed reactors or fixed bed reactors, with a preferred embodiment using moving bed reactors. The fired heaters can be configured to be elevated or positioned on the ground to reduce the transfer line distances from the outlet manifold outlets to the reactor process fluid inlets.

For moving bed reactors with external catalyst collectors, the reactor process fluid inlet is usually at the bottom of the reactor. In this embodiment, the fired heater would be disposed at grade with the convection bank positioned to the side, or even above the fired heater. The outlet manifold outlet is disposed to minimize the elevation differences between the outlet manifold outlet and the reactor process fluid inlet.

For moving bed reactors with internal catalyst collectors, the reactor process fluid inlet is usually at the top of the reactor. In this embodiment, the radiant fired heater is elevated such that the outlet manifold outlet can be at a similar elevation as the reactor process fluid inlet.

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. An integrated apparatus for a reforming system, comprising:
    a plurality of radiant fired heaters having at least one process coil disposed within the heater, burners, and a flue gas outlet, wherein at least one process coil has one outlet, at least one inlet, and wherein the flue gas outlet is disposed on the lower surface of the fired heater; and
    one outlet manifold per heater having an inlet in fluid communication with the outlet of the at least one process coil, and at least one manifold outlet;
    wherein each process coil has a configuration of three tubes in a parallel orientation, with two semi-circular tubular sections connecting the ends of the tubes, such that the tubes and tubular sections form a W-shaped coil, with the central tube having a diameter greater than a diameter of the two outer tubes, and the central tube having one end connected to the inlet of the outlet manifold.

2. The integrated apparatus of claim 1 further comprising a convection bank having an inlet in fluid communication with the flue gas outlet, and heating tubes, wherein the heating tubes have an inlet and an outlet.

3. The integrated apparatus of claim 2, wherein the heating tubes are for steam generation.

4. The integrated apparatus of claim 1 further comprising a plurality of moving bed reactors, wherein there is one radiant fired heater for each reactor.

5. The integrated apparatus of claim 4 wherein the reactors are stacked vertically, and the radiant fired heaters are arranged side-by-side near the stack of reactors.

6. The integrated apparatus of claim 1 wherein the process coil inlet and the outlet are disposed on an upper surface of the fired heater.

7. The integrated apparatus of claim 1 wherein the radiant fired heaters are arranged in a side-by-side disposition.

8. An integrated apparatus for a reforming system, comprising:
    a plurality of moving bed reactors, each reactor having a process fluid inlet and a process fluid outlet;
    a plurality of radiant fired heaters having at least one process coil disposed within the heater, burners, and a flue gas outlet, wherein the at least one process coil has a configuration of three tubes in a parallel orientation, with two semi-circular tubular sections connecting the ends of the tubes, such that the tubes and tubular sections form a W-shaped coil, with the central tube having a diameter greater than a diameter of the two outer tubes, and each of the outer tubes having an inlet and the central tube having an outlet, and wherein the flue gas outlet is disposed on the lower surface of the fired heater;
    at least two inlet manifolds, each inlet manifold having an inlet, and multiple outlets, with each inlet manifold outlet in fluid communication with the inlet of one of the outer tubes; and
    one outlet manifold per heater having an inlet in fluid communication with the outlet of the central tube and at least one manifold outlet in fluid communication with the reactor process fluid inlet.

9. The integrated apparatus of claim 8 wherein the reactors are stacked vertically, and the radiant fired heaters are arranged side-by-side near the stack of reactors.

10. The integrated apparatus of claim 9 wherein the plurality of reactors comprises four reactors stacked vertically.

11. The integrated apparatus of claim 8 wherein the process coil inlet and the outlet are disposed on the upper surface of the fired heater.

12. The integrated apparatus of claim 8 wherein the process coil inlet and the outlet are disposed on the upper surface of the fired heater.

13. An integrated apparatus for a reforming system, comprising:
    a plurality of reactors, each reactor having a process fluid inlet and a process fluid outlet,
    a plurality of radiant fired heaters having at least one process coil disposed within the heater, burners, and a flue gas outlet, wherein the at least one process coil has a compressed design including at least two tubular sections, wherein each tubular section has an inlet, and the tubular sections merge to form a third tubular section with one outlet, and wherein the flue gas outlet is disposed on the lower surface of the fired heater; and
    one outlet manifold per heater having an inlet in fluid communication with the outlet of the third tubular section and at least one manifold outlet in fluid communication with the reactor process fluid inlet.

14. The integrated apparatus of claim 13 wherein each process coil has a configuration of three tubes in a parallel orientation, with two semi-circular tubular sections connecting the ends of the tubes, such that the tubes and tubular sections form a W-shaped coil, with the central tube having an increased diameter, and the two smaller tubes having one end connected to an inlet and the larger central tube having one end connected to the outlet.

15. The integrated apparatus of claim 13 wherein the reactors are moving bed reactors.

16. The integrated apparatus of claim 13 wherein the reactors are fixed bed reactors.

17. The integrated apparatus of claim 13 wherein the reactors are stacked vertically, and the radiant fired heaters are arranged side-by-side near the stack of reactors.

* * * * *